(12) United States Patent
Hyun

(10) Patent No.: US 9,477,339 B2
(45) Date of Patent: Oct. 25, 2016

(54) STRETCHABLE DISPLAY DEVICES AND METHODS OF COMPENSATING LUMINANCE OF THE SAME

(71) Applicant: Samsung Display Co., Ltd., Yongin, Gyeonggi-Do (KR)

(72) Inventor: Chang-Ho Hyun, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 27 days.

(21) Appl. No.: 14/672,011

(22) Filed: Mar. 27, 2015

(65) Prior Publication Data
US 2016/0077553 A1 Mar. 17, 2016

(30) Foreign Application Priority Data

Sep. 15, 2014 (KR) .................. 10-2014-0121714

(51) Int. Cl.
*G09G 3/3225* (2016.01)
*G06F 3/041* (2006.01)
*G06F 3/045* (2006.01)
*G09G 3/32* (2016.01)
*G09G 3/36* (2006.01)

(52) U.S. Cl.
CPC ............. *G06F 3/0412* (2013.01); *G06F 3/045* (2013.01); *G09G 3/3208* (2013.01); *G09G 3/3225* (2013.01); *G09G 3/3611* (2013.01); *G06F 2203/04102* (2013.01); *G09G 2320/0223* (2013.01); *G09G 2320/0233* (2013.01); *G09G 2320/0666* (2013.01); *G09G 2330/021* (2013.01); *G09G 2330/12* (2013.01); *G09G 2380/02* (2013.01)

(58) Field of Classification Search
CPC .... G06F 3/045; G06F 3/0416; G06F 3/0418; G06F 3/0412
See application file for complete search history.

(56) References Cited

U.S. PATENT DOCUMENTS

| 7,109,967 B2* | 9/2006 | Hioki | G06F 3/0412 345/104 |
| 8,766,925 B2* | 7/2014 | Perlin | G06F 3/0233 345/156 |
| 8,922,523 B2* | 12/2014 | Lynch | G06F 3/0414 345/174 |
| 8,922,531 B2* | 12/2014 | Lee | G06F 1/1652 345/173 |

(Continued)

FOREIGN PATENT DOCUMENTS

| KR | 10-2005-0057478 A | 6/2005 |
| KR | 10-2012-0038334 A | 4/2012 |

(Continued)

*Primary Examiner* — Patrick F Marinelli
(74) *Attorney, Agent, or Firm* — Lewis Roca Rothgerber Christie LLP

(57) ABSTRACT

A stretchable display device includes: a stretchable display panel including: pixels; a first resistive film extending in a first direction; and a second resistive film extending in a second direction; a scan driver to provide a scan signal to the pixels; a data driver to provide a data signal or a compensated data signal to the pixels; a row detection driver to detect a first current flowing through the first resistive film to generate a first detection signal; a column detection driver to detect a second current flowing through the second resistive film to generate a second detection signal; a compensation control signal generator to receive the first and the second detection signals to detect amounts of variations of the first and the second currents, and to generate a compensation control signal; and a timing controller to generate the compensated data signal based on the compensation control signal.

17 Claims, 10 Drawing Sheets

(56) References Cited

U.S. PATENT DOCUMENTS

| | | | | |
|---|---|---|---|---|
| 9,001,010 B2* | 4/2015 | Jeon | G06F 1/00 | 345/108 |
| 9,224,366 B1* | 12/2015 | Park | H04N 13/0497 | |
| 9,250,851 B2* | 2/2016 | Lu | G06F 3/1446 | |
| 2003/0227441 A1* | 12/2003 | Hioki | G06F 3/0412 | 345/156 |
| 2006/0109391 A1 | 5/2006 | Huitema et al. | | |
| 2006/0274036 A1* | 12/2006 | Hioki | G06F 3/0412 | 345/156 |
| 2008/0018631 A1* | 1/2008 | Hioki | G02F 1/133305 | 345/206 |
| 2009/0256817 A1* | 10/2009 | Perlin | G06F 3/0233 | 345/174 |
| 2010/0011291 A1* | 1/2010 | Nurmi | G06F 3/0414 | 715/702 |
| 2010/0097343 A1* | 4/2010 | Fang | G06F 3/0416 | 345/174 |
| 2011/0134145 A1* | 6/2011 | Moriwaki | G09G 3/3208 | 345/660 |
| 2011/0227822 A1* | 9/2011 | Shai | G06F 1/1615 | 345/156 |
| 2012/0092363 A1* | 4/2012 | Kim | G06T 5/006 | 345/618 |
| 2013/0032861 A1* | 2/2013 | Lee | G06F 3/047 | 257/254 |
| 2013/0100053 A1* | 4/2013 | Kang | G06F 3/03 | 345/173 |
| 2013/0135244 A1* | 5/2013 | Lynch | G06F 3/0414 | 345/174 |
| 2013/0201093 A1* | 8/2013 | Kim | G06F 3/033 | 345/156 |
| 2013/0257775 A1* | 10/2013 | Lee | G06F 3/0416 | 345/173 |
| 2014/0028596 A1* | 1/2014 | Seo | G06F 3/0487 | 345/173 |
| 2014/0028597 A1* | 1/2014 | Cho | G06F 3/0487 | 345/173 |
| 2014/0043226 A1* | 2/2014 | Lee | G06F 3/03 | 345/156 |
| 2014/0062856 A1* | 3/2014 | Lu | G06F 3/1446 | 345/156 |
| 2014/0062859 A1* | 3/2014 | Lee | G06F 3/01 | 345/156 |
| 2014/0118319 A1* | 5/2014 | Jeon | G06F 1/00 | 345/207 |
| 2014/0174190 A1 | 6/2014 | Kulkarni et al. | | |
| 2014/0306985 A1* | 10/2014 | Jeong | G09G 3/3233 | 345/601 |
| 2015/0091796 A1* | 4/2015 | Kwon | G06T 3/40 | 345/156 |
| 2016/0041680 A1* | 2/2016 | Chi | H04B 1/385 | 345/173 |
| 2016/0077553 A1* | 3/2016 | Hyun | G06F 1/1652 | 345/690 |

FOREIGN PATENT DOCUMENTS

| KR | 10-2013-0015542 A | 2/2013 |
|---|---|---|
| KR | 10-2014-0018379 A | 2/2014 |

* cited by examiner

STRETCHABLE DISPLAY DEVICES AND METHODS OF COMPENSATING LUMINANCE OF THE SAME

CROSS-REFERENCE TO RELATED APPLICATION

This application claims priority under 35 USC §119 to and the benefit of Korean Patent Application No. 10-2014-0121714, filed on Sep. 15, 2014 in the Korean Intellectual Property Office (KIPO), the contents of which are incorporated herein in its entirety by reference.

BACKGROUND

1. Field

Example embodiments relate generally to a display device.

2. Description of the Related Art

Recently, interest for a stretchable display device including a stretchable display panel has increased, where a size (or area) of the stretchable display panel may be changed, because the stretchable display panel has elasticity and flexibility in an X-axis direction and a Y-axis direction of the stretchable display panel. However, in the stretchable display device, when the size of the stretchable display panel is changed based on its elasticity and flexibility, structure of pixels included in the stretchable display panel may be deformed. Thus, resistances of electrodes included in the pixels may be changed, and characteristics (e.g., threshold voltage, mobility, etc.) of thin film transistors included in the pixels may be changed. As a result, in the stretchable display device, luminance non-uniformity (e.g., luminance spot, etc.) may occur on the stretchable display panel, because current flowing in the pixels is changed as the size of the stretchable display panel is changed.

The above information disclosed in this Background section is only for enhancement of understanding of the background of the invention, and therefore, it may contain information that does not form the prior art that is already known to a person of ordinary skill in the art.

SUMMARY

Some aspects of example, embodiments of the present inventive concept relate to a stretchable display device including a stretchable display panel of which a size (or area) is changed based on its elasticity and flexibility, and a method of compensating luminance of the stretchable display device.

One or more example embodiments provide a stretchable display device capable of preventing or reducing luminance non-uniformity of a stretchable display panel that is caused when a size (or area) of the stretchable display panel is changed based on its elasticity and flexibility.

One or more example embodiments provide a method of compensating luminance of a stretchable display device capable of preventing or reducing luminance non-uniformity of a stretchable display panel that is caused when a size of the stretchable display panel is changed based on its elasticity and flexibility.

According to an example embodiment, a stretchable display device includes: a stretchable display panel including: a plurality of pixels; at least one first resistive film extending in a first direction; and at least one second resistive film extending in a second direction intersecting with the first direction on the stretchable display panel; a scan driver configured to provide a scan signal to the pixels via a plurality of scan-lines; a data driver configured to provide a data signal or a compensated data signal to the pixels via a plurality of data-lines; a row detection driver configured to detect a first current flowing through the first resistive film to generate a first detection signal corresponding to the first current; a column detection driver configured to detect a second current flowing through the second resistive film to generate a second detection signal corresponding to the second current; a compensation control signal generator configured to receive the first detection signal to detect an amount of variation of the first current, to receive the second detection signal to detect an amount of variation of the second current, and to generate a compensation control signal based on the amount of the variation of the first current and the amount of the variation of the second current; and a timing controller configured to control the scan driver and the data driver, and to generate the compensated data signal based on the compensation control signal.

In example embodiments, the compensation control signal may include at least one selected from a first digital signal and a second digital signal, the first digital signal may correspond to a row location of the pixels to which the compensated data signal is to be applied, and the second digital signal may correspond to a column location of the pixels to which the compensated data signal is to be applied In example embodiments, the first detection signal and the second detection signal may be signals corresponding to respective voltages, and each of the row detection driver and the column detection driver may include at least one current-voltage conversion circuit.

In example embodiments, the compensation control signal generator may include: a first voltage comparator configured to compare the first detection signal with a first reference voltage to output a first comparison signal; a second voltage comparator configured to compare the second detection signal with a second reference voltage to output a second comparison signal; a first analog-digital converter configured to perform an analog-digital converting operation on the first comparison signal to generate the first digital signal; and a second analog-digital converter configured to perform an analog-digital converting operation on the second comparison signal to generate the second digital signal.

In example embodiments, the compensation control signal generator may further include: a first voltage amplifier configured to amplify the first detection signal; and a second voltage amplifier configured to amplify the second detection signal.

In example embodiments, the compensation control signal generator may further include: a third voltage amplifier configured to amplify the first comparison signal; and a fourth voltage amplifier configured to amplify the second comparison signal.

In example embodiments, the first detection signal and the second detection signal may be signals corresponding to respective currents, and each of the row detection driver and the column detection driver may include at least one current sensing circuit.

In example embodiments, the compensation control signal generator may include: a first current comparator configured to compare the first detection signal with a first reference current to output a first comparison signal; a second current comparator configured to compare the second detection signal with a second reference current to output a second comparison signal; a first analog-digital converter configured to perform an analog-digital converting operation on the first comparison signal to generate the first digital signal; and a second analog-digital converter configured to perform an analog-digital converting operation on the second comparison signal to generate the second digital signal.

In example embodiments, the compensation control signal generator may further include: a first current amplifier configured to amplify the first detection signal; and a second current amplifier configured to amplify the second detection signal.

In example embodiments, the compensation control signal generator may further include: a first voltage amplifier configured to amplify the first comparison signal; and a second voltage amplifier configured to amplify the second comparison signal.

In example embodiments, the stretchable display device may include an organic light emitting display device that includes a power supply configured to provide a high power voltage and a low power voltage to the pixels via a plurality of power-lines.

In example embodiments, the stretchable display device may include a liquid crystal display device that includes a backlight unit configured to provide light to the stretchable display panel.

According to another example embodiment, a stretchable display device includes: a stretchable display panel including: a plurality of pixels; at least one first resistive film extending in a first direction; and at least one second resistive film extending in a second direction intersecting with the first direction on the stretchable display panel; a scan driver configured to provide a scan signal to the pixels via a plurality of scan-lines; a data driver configured to provide a data signal to the pixels via a plurality of data-lines; a row detection driver configured to detect a first current flowing through the first resistive film to generate a first detection signal corresponding to the first current; a column detection driver configured to detect a second current flowing through the second resistive film to generate a second detection signal corresponding to the second current; a compensation control signal generator configured to receive the first detection signal to detect an amount of variation of the first current, to receive the second detection signal to detect an amount of variation of the second current, and to generate a compensation control signal based on the amount of the variation of the first current and the amount of the variation of the second current; a timing controller configured to control the scan driver and the data driver; and a power supply configured to generate a compensated power voltage based on the compensation control signal, and to provide a power voltage or the compensated power voltage to the stretchable display panel via a plurality of power-lines.

In example embodiments, the stretchable display device may include an organic light emitting display device, and the power supply may be configured to generate the compensated power voltage by compensating at least one selected from a high power voltage and a low power voltage that are applied to the pixels.

In example embodiments, the compensation control signal may include at least one selected from a first digital signal and a second digital signal, the first digital signal may correspond to a row location of the pixels to which the compensated power voltage is to be applied, and the second digital signal may correspond to a column location of the pixels to which the compensated power voltage is to be applied.

In example embodiments, the first detection signal and the second detection signal may be signals corresponding to respective voltages, and each of the row detection driver and the column detection driver may include at least one current-voltage conversion circuit.

In example embodiments, the compensation control signal generator may include: a first voltage comparator configured to compare the first detection signal with a first reference voltage to output a first comparison signal; a second voltage comparator configured to compare the second detection signal with a second reference voltage to output a second comparison signal; a first analog-digital converter configured to perform an analog-digital converting operation on the first comparison signal to generate the first digital signal; and a second analog-digital converter configured to perform an analog-digital converting operation on the second comparison signal to generate the second digital signal.

In example embodiments, the first detection signal and the second detection signal may be signals indicating respective currents, and each of the row detection driver and the column detection driver may include at least one current sensing circuit.

In example embodiments, the compensation control signal generator may include: a first current comparator configured to compare the first detection signal with a first reference current to output a first comparison signal; a second current comparator configured to compare the second detection signal with a second reference current to output a second comparison signal; a first analog-digital converter configured to perform an analog-digital converting operation on the first comparison signal to generate the first digital signal; and a second analog-digital converter configured to perform an analog-digital converting operation on the second comparison signal to generate the second digital signal.

According to an example embodiment, a method of compensating luminance of a stretchable display device includes: detecting a current flowing through a resistive film formed on a stretchable display panel; generating a compensation control signal based on an amount of variation of the current; and compensating a data signal or a power voltage to be applied to the stretchable display panel based on the compensation control signal.

Therefore, a stretchable display device according to some example embodiments may prevent or reduce luminance non-uniformity of a stretchable display panel that is caused when a size (or area) of the stretchable display panel is changed based on its elasticity and flexibility by: controlling a row detection driving unit and/or a column detection driving unit to detect a current flowing through a resistive film formed (or deposited) on the stretchable display panel; controlling a compensation control signal generating unit to generate a compensation control signal based on an amount of variation of the current; and controlling a timing control unit to generate a compensated data signal based on the compensation control signal to provide the compensated data signal to the stretchable display panel, or controlling a power supply unit to generate a compensated power voltage based on the compensation control signal to provide the compensated power voltage to the stretchable display panel.

In addition, a method of compensating luminance of a stretchable display device according to some example embodiments may prevent or reduce luminance non-uniformity of a stretchable display panel that is caused when a size of the stretchable display panel is changed based on its elasticity and flexibility by: detecting a current flowing through a resistive film formed (or, deposited) on the stretchable display panel; generating a compensation control signal based on an amount of variation of the current; and providing a feedback signal (e.g., a compensated data signal or a compensated power voltage) to the stretchable display panel based on the compensation control signal.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
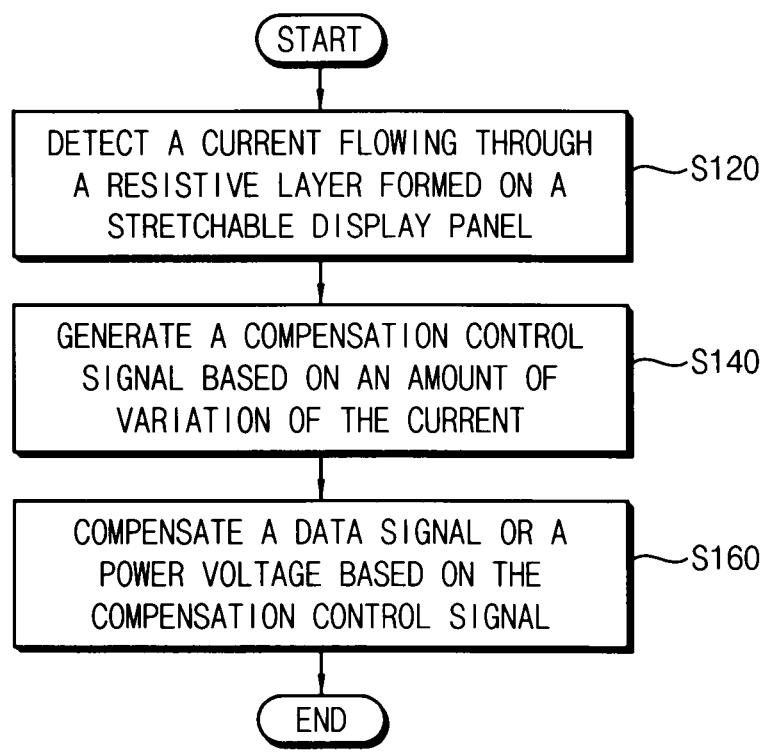
FIG. 1 is a flowchart illustrating a method of compensating luminance of a stretchable display device according to some example embodiments.

Hereinafter, embodiments of the present inventive concept will be described in more detail with reference to the accompanying drawings. The present inventive concept, however, may be embodied in various different forms, and should not be construed as being limited to only the illustrated embodiments herein. Rather, these embodiments are provided as examples so that this disclosure will be thorough and complete, and will fully convey some of the aspects and features of the present inventive concept to those skilled in the art. Accordingly, processes, elements, and techniques that are not necessary to those having ordinary skill in the art for a complete understanding of the aspects and features of the present inventive concept are not described with respect to some of the embodiments of the present inventive concept. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
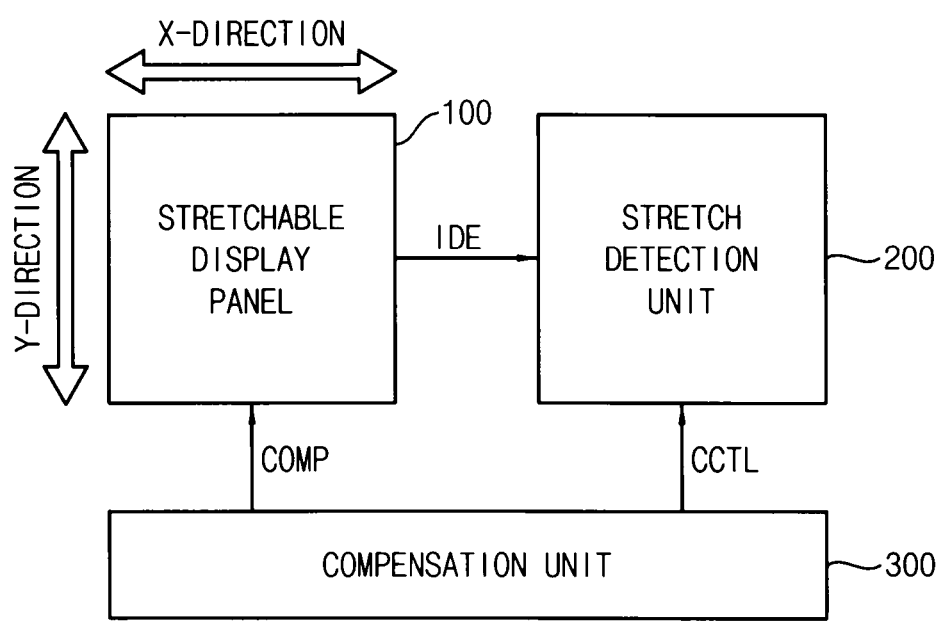
FIG. 2 is a block diagram for illustrating the method of FIG. 1.

FIG. 1 is a flowchart illustrating a method of compensating luminance of a stretchable display device according to some example embodiments. FIG. 2 is a block diagram for illustrating the method of FIG. 1.

Referring to FIGS. 1 and 2, the method shown in FIG. 1 may include detecting a current IDE flowing through a resistive film formed (or deposited) on a stretchable display panel 100 of a stretchable display device (S120), generating a compensation control signal CCTL based on an amount of variation of the current IDE (S140), and compensating a data signal or a power voltage to be applied to the stretchable display panel 100 based on the compensation control signal CCTL (S160). Here, the current IDE may flow through the resistive film when a voltage source is connected between both ends of the resistive film.

The stretchable display panel 100 may have elasticity and flexibility in an X-axis direction X-DIRECTION and a Y-axis direction Y-DIRECTION of the stretchable display panel 100. Thus, a size (or area) of the stretchable display panel 100 may be changed based on its elasticity and flexibility. In this case, since a structure of pixels included in the stretchable display panel 100 is deformed, resistances of electrodes included in the pixels may be changed, and characteristics (e.g., threshold voltage, mobility, etc) of thin film transistors included in the pixels may be changed. As a result, in the stretchable display device, luminance non-uniformity (e.g., luminance spot, etc.) may occur on the stretchable display panel 100, because a current flowing in the pixels included in the stretchable display panel 100 is changed (e.g., luminance change) as the size of the stretchable display panel 100 is changed. According to the method of FIG. 1, the current IDE flowing through the resistive film formed on the stretchable display panel 100 may be detected (S120), and the compensation control signal CCTL based on the amount of variation of the current IDE may be generated (S140). For example, a stretch detection unit 200 (e.g., a stretch detector) may be included in the stretchable display device to detect the current IDE flowing through the resistive film formed on the stretchable display panel 100, and may generate the compensation control signal CCTL based on the amount of variation of the current IDE. Here, the resistive film formed on the stretchable display panel 100 may include at least one first resistive film extended in the X-axis direction X-DIRECTION of the stretchable display panel 100 and/or at least one second resistive film extended in the Y-axis direction Y-DIRECTION of the stretchable display panel 100. The stretch detection unit 200 may include a row detection driving unit (e.g., a row detection driver) to detect the current IDE flowing through the first resistive film, a column detection driving unit (e.g., a column detection driver) to detect the current IDE flowing through the second resistive film, and a compensation control signal generating unit (e.g., a compensation control signal generator) to generate the compensation control signal CCTL based on the amount of variation of the current IDE.

According to the method shown in FIG. 1, the data signal or the power voltage to be applied to the stretchable display panel 100 may be compensated based on the compensation control signal CCTL (S160). For example, a compensation unit 300 (e.g., a compensator) may be included in the stretchable display device to generate a feedback signal COMP to be applied to the stretchable display panel 100 based on the compensation control signal CCTL, and may provide the feedback signal COMP to the stretchable display panel 100. In an example embodiment, the compensation unit 300 included in the stretchable display device may be a timing control unit (e.g., a timing controller). In this case, the timing control unit may generate a compensated data signal by compensating a data signal to be applied to the pixels. As a result, since the compensated data signal is applied to the pixels that are located in a region in which a change of the current IDE is detected, a luminance change due to a size change of the stretchable display panel 100 may be prevented or reduced. Although it is described above that the compensation unit 300 is the timing control unit, the compensation unit 300 is not limited thereto. For example, the compensation unit 300 may be a signal compensation unit (e.g., a signal compensator) coupled to a data driving unit (e.g., a data driver) or a signal compensation unit coupled between the data driving unit and the timing control unit. In another example embodiment, the compensation unit 300 included in the stretchable display device may be a power supply unit (e.g., a power supply). In this case, the power supply unit may generate a compensated power voltage by compensating a power voltage to be applied to the pixels. As a result, since the compensated power voltage is applied to the pixels that are located in a region in which a change of the current IDE is detected, a luminance change due to a size change of the stretchable display panel 100 may be prevented or reduced. Here, the power voltage may include a high power voltage ELVDD and a low power voltage ELVSS. In addition, the compensated power voltage may be generated by compensating at least one selected from the high power voltage ELVDD and the low power voltage ELVSS.

As described above, the method shown in FIG. 1 may prevent or reduce luminance non-uniformity of the stretchable display panel 100 that is caused when a size (or area) of the stretchable display panel 100 is changed based on its elasticity and flexibility, by detecting the current IDE flowing through the resistive film formed on the stretchable display panel 100, by generating the compensation control signal CCTL based on the amount of variation of the current IDE, and by providing the feedback signal COMP (e.g., the compensated data signal or the compensated power voltage) to the stretchable display panel 100 based on the compensation control signal CCTL. This is because luminance of the stretchable display panel 100 is changed as the size of the stretchable display panel 100 is changed. That is, as the size of the stretchable display panel 100 is changed, resistance of the resistive film formed on the stretchable display panel 100 may be changed. In addition, as the resistance of the resistive film formed on the stretchable display panel 100 is changed, the current IDE flowing through the resistive film may be changed (i.e., Voltage (V)=Current (I)×Resistance (R)). Further, as the current IDE flowing through the resistive film is changed, the current flowing in the pixels included in the stretchable display panel 100 may be changed. In addition, as the current flowing in the pixels included in the stretchable display panel 100 is changed, the luminance of the stretchable display panel 100 may be changed. Hence, the luminance of the stretchable display panel 100 may be changed as the size of the stretchable display panel 100 is changed. Accordingly, the method shown in FIG. 1 may detect a resistance change of the resistive film due to the size change of the stretchable display panel 100, and may provide the feedback signal COMP (e.g., the compensated data signal or the compensated power voltage) to the stretchable display panel 100 in response to the resistance change of the resistive film. As a result, in the stretchable display device, the luminance of the stretchable display panel 100 may be compensated in real-time. In this case, chromaticity coordinates of the stretchable display panel 100 may also be compensated. In some example embodiments, the method shown in FIG. 1 may more accurately compensate the luminance of the stretchable display panel 100 by detecting the luminance change of the stretchable display panel 100 using a light sensor, and by reflecting the detection result in the feedback signal COMP.

Figure 3:
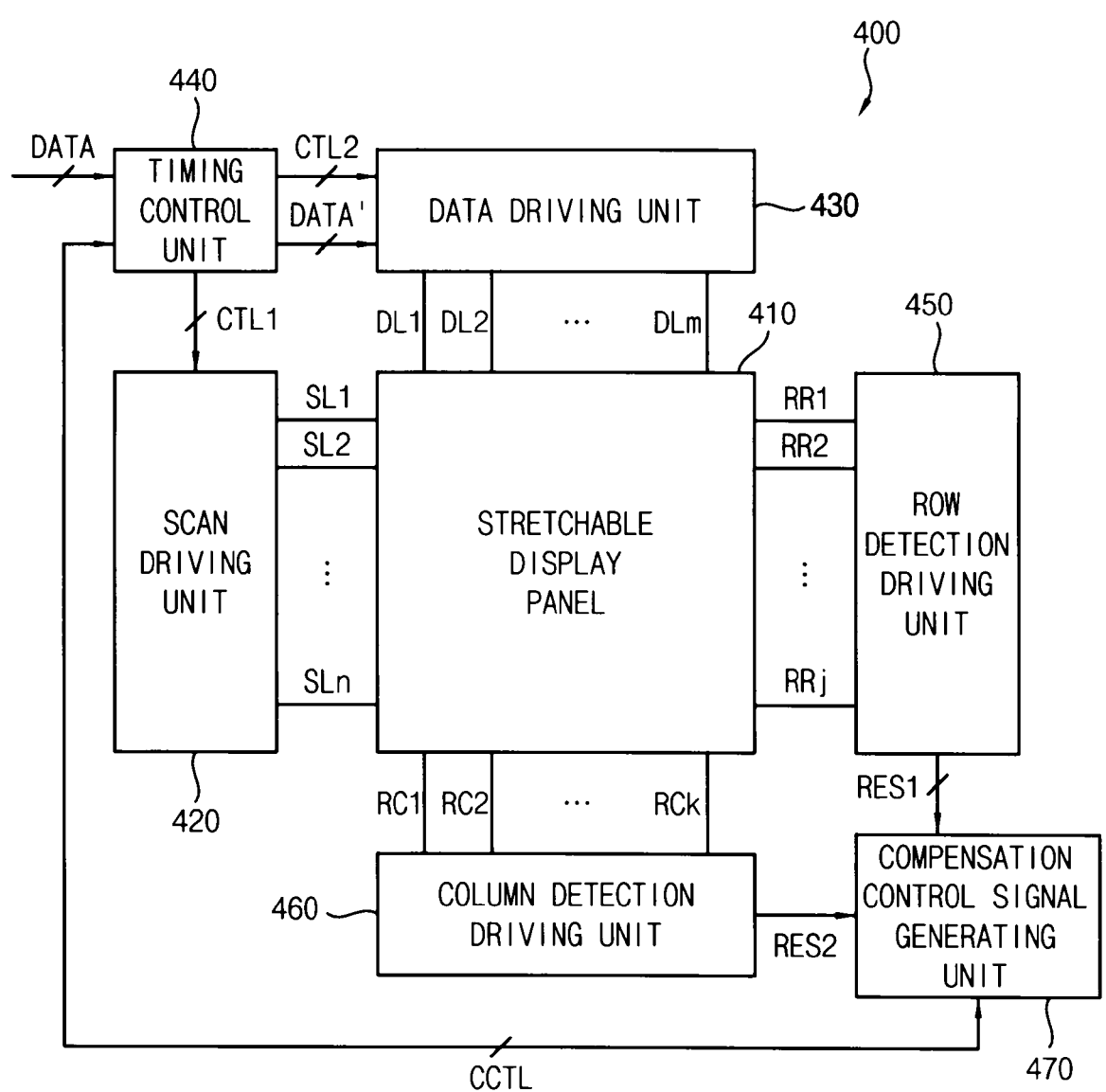
FIG. 3 is a block diagram illustrating a stretchable display device according to some example embodiments.

FIG. 3 is a block diagram illustrating a stretchable display device according to some example embodiments.

Referring to FIG. 3, the stretchable display device 400 may include a stretchable display panel 410, a scan driving unit 420 (e.g., a scan driver), a data driving unit 430 (e.g., a data driver), a timing control unit 440 (e.g., a timing controller), a row detection driving unit 450 (e.g., a row detection driver), a column detection driving unit 460 (e.g., a column detection driver), and a compensation control signal generating unit 470 (e.g., a compensation control signal generator). In an example embodiment, the stretchable display device 400 may be an organic light emitting display device. In this case, the stretchable display device 400 may further include a power supply unit (e.g., a power supply) to provide power voltages ELVDD and ELVSS to the pixels via a plurality of power-lines. In another example embodiment, the stretchable display device 400 may be a liquid crystal display device. In this case, the stretchable display device 400 may further include a backlight unit (e.g., a backlight) to provide light to the stretchable display panel 410. However, the stretchable display device 400 is not limited thereto.

The stretchable display panel 410 may include a plurality of pixels. The stretchable display panel 410 may be coupled to the scan driving unit 420 via first through n-th scan-lines SL1 through SLn, where n is an integer greater than or equal to 2. The stretchable display panel 410 may be coupled to the data driving unit 430 via first through m-th data-lines DL1 through DLm, where m is an integer greater than or equal to 2. Here, since the pixels are located at crossings (or crossing regions) of the first through n-th scan-lines SL1 through SLn and the first through m-th data-lines DL1 through DLm, the stretchable display panel 410 may include n×m pixels. The stretchable display panel 410 may have elasticity and flexibility in a first direction (e.g., a direction parallel to the first through n-th scan-lines SL1 through SLn) and in a second direction (e.g., a direction parallel to the first through m-th data-lines DL1 through DLm). Thus, a size (or area) of the stretchable display panel 410 may be changed based on its elasticity and flexibility. Here, at least one first resistive film RR1 through RRj extending in the first direction, and at least one second resistive film RC1 through RCk extending in the second direction intersecting (or crossing) the first direction may be formed (or, deposited) on the stretchable display panel 410, where j and k are integers greater than or equal to 1. As illustrated in FIG. 3, the first direction may be a row direction (e.g., a direction parallel to the first through n-th scan-lines SL1 through SLn), and the second direction may be a column direction (e.g., a direction parallel to the first through m-th data-lines DL1 through DLm). However, the first and second directions are not limited thereto. For example, the first direction may not be perpendicular to the second direction.

The scan driving unit 420 may provide a scan signal to the stretchable display panel 410 via the first through n-th scan-lines SL1 through SLn. The data driving unit 430 may provide a data signal DATA or a compensated data signal DATA' to the stretchable display panel 410 via the first through m-th data-lines DL1 through DLm. That is, as a size of the stretchable display panel 410 is changed, the data driving unit 430 may provide the data signal DATA to the pixels that are located in a region in which a current change is not detected when currents flowing through the resistive films RR1 through RRj and RC1 through RCk formed on the stretchable display panel 410 are monitored, and may provide the compensated data signal DATA' to the pixels that are located in a region in which a current change is detected when the currents flowing through the resistive films RR1 through RRj and RC1 through RCk formed on the stretchable display panel 410 are monitored. The row detection driving unit 450 may detect the first current flowing through the first resistive film RR1 through RRj extending in the first direction to generate a first detection signal RES1 corresponding to (e.g., indicating) the first current. The column detection driving unit 460 may detect the second current flowing through the second resistive film RC1 through RCk extending in the second direction to generate a second detection signal RES2 corresponding to (e.g., indicating) the second current. The compensation control signal generating unit 470 may receive the first detection signal RES1 from the row detection driving unit 450 to detect an amount of variation of the first current, may receive the second detection signal RES2 from the column detection driving unit 460 to detect an amount of variation of the second current, and may generate a compensation control signal CCTL based on the amount of variation of the first current and the amount of variation of the second current.

In an example embodiment, the first detection signal RES1 output from the row detection driving unit 450 and the second detection signal RES2 output from the column detection driving unit 460 are signals indicating respective voltages. In this case, the row detection driving unit 450 may include at least one current-voltage conversion circuit that detects the first current flowing through the first resistive film RR1 through RN extending in the first direction, and converts the detected first current into a voltage (e.g., a specific voltage). In addition, the column detection driving unit 460 may include at least one current-voltage conversion circuit that detects the second current flowing through the second resistive film RC1 through RCk extending in the second direction, and converts the detected second current into a voltage (e.g., a specific voltage). For example, as illustrated in FIG. 3, since the stretchable display panel 410 includes the first resistive film RR1 through RRj, the row detection driving unit 450 may include j current-voltage conversion circuits. In addition, since the stretchable display panel 410 includes the second resistive film RC1 through RCk, the column detection driving unit 460 may include k current-voltage conversion circuits. In another example embodiment, the first detection signal RES1 output from the row detection driving unit 450 and the second detection signal RES2 output from the column detection driving unit 460 are signals indicating respective currents. In this case, the row detection driving unit 450 may include at least one current sensing circuit (e.g., current sensor, etc.) that detects the first current flowing through the first resistive film RR1 through RRj extending in the first direction. In addition, the column detection driving unit 460 may include at least one current sensing circuit that detects the second current flowing through the second resistive film RC1 through RCk extending in the second direction. For example, as illustrated in FIG. 3, since the stretchable display panel 410 includes the first resistive film RR1 through RRj, the row detection driving unit 450 may include j current sensing circuits. In addition, since the stretchable display panel 410 includes the second resistive film RC1 through RCk, the column detection driving unit 460 may include k current sensing circuits.

The compensation control signal CCTL output from the compensation control signal generating unit 470 may include at least one selected from a first digital signal and a second digital signal. Here, the first digital signal may indicate a row location of the pixels to which the compensated data signal DATA' is to be applied, and the second digital signal may indicate a column location of the pixels to which the compensated data signal DATA' is to be applied. In other words, the compensation control signal generating unit 470 may generate the first digital signal based on the first detection signal RES1 output from the row detection driving unit 450, and may generate the second digital signal based on the second detection signal RES2 output from the column detection driving unit 460. Thus, the stretchable display device 400 may perform luminance compensation for the stretchable display panel 410 in real-time, by detecting a current change of respective locations of the stretchable display panel 410 as the size of the stretchable display panel 410 is changed (e.g., a physical change of the stretchable display panel 410 occurs). As a result, a luminance change of the stretchable display panel 410 due to a size change of the stretchable display panel 410 may be prevented or reduced. Accordingly, when the first detection signal RES1 output from the row detection driving unit 450 and the second detection signal RES2 output from the column detection driving unit 460 are signals indicating respective voltages, the compensation control signal generating unit 470 may include a plurality of voltage comparators and a plurality of analog-digital converters. When the first detection signal RES1 output from the row detection driving unit 450 and the second detection signal RES2 output from the column detection driving unit 460 are signals indicating respective currents, the compensation control signal generating unit 470 may include a plurality of current comparators and a plurality of analog-digital converters. The row detection driving unit 450 and the column detection driving unit 460 will be further described below with reference to FIGS. 4 through 7.

The timing control unit 440 may generate control signals CTL1 and CTL2, and may provide the control signals CTL1 and CTL2 to the scan driving unit 420 and the data driving unit 430 to control the scan driving unit 420 and the data driving unit 430. Here, the timing control unit 440 may receive the compensation control signal CCTL from the compensation control signal generating unit 470, and may generate the compensated data signal DATA' by compensating the data signal DATA based on the compensation control signal CCTL. In some example embodiments, the timing control unit 440 may provide the data signal DATA to the data driving unit 430, and the data driving unit 430 may generate the compensated data signal DATA' by compensating the data signal DATA based on the compensation control signal CCTL output from the compensation control signal generating unit 470. In some example embodiments, the timing control unit 440 may provide the data signal DATA to a signal compensation unit (e.g., a signal compensator) coupled between the timing control unit 440 and the data driving unit 430. The signal compensation unit may generate the compensated data signal DATA' by compensating the data signal DATA based on the compensation control signal CCTL output from the compensation control signal generating unit 470, and the data driving unit 430 may receive the compensated data signal DATA' from the signal compensation unit. Thus, although it is described above that the timing control unit 440 generates the compensated data signal DATA' by compensating the data signal DATA based on the compensation control signal CCTL, the present invention is not limited thereto, and it should be understood that the above-described operation of the timing control unit 440 may include an operation in which the data driving unit 430 or the signal compensation unit generates the compensated data signal DATA' by compensating the data signal DATA based on the compensation control signal CCTL under the control of the timing control unit 440.

Accordingly, the stretchable display device 400 may prevent or reduce luminance non-uniformity of the stretchable display panel 410 that is caused when the size of the stretchable display panel 410 is changed based on its elasticity and flexibility: by controlling the row detection driving unit 450 and/or the column detection driving unit 460 to detect a current flowing through the resistive films RR1 through RRj and RC1 through RCk formed (or, deposited) on the stretchable display panel 410; by controlling the compensation control signal generating unit 470 to generate the compensation control signal CCTL based on the amount of variation of the current; and by controlling the timing control unit 440 to generate the compensated data signal DATA' based on the compensation control signal CCTL, to provide the compensated data signal DATA' to the stretchable display panel 410. In an example embodiment, the row detection driving unit 450 may sequentially detect the first currents flowing through the first resistive films RR1 through RRj along the second direction, when detecting the first currents flowing through the first resistive films RR1 through RRj extending in the first direction. In addition, the column detection driving unit 460 may sequentially detect the second currents flowing through the second resistive films RC1 through RCk along the first direction, when detecting the second currents flowing through the second resistive films RC1 through RCk extending in the second direction. In another example embodiment, the row detection driving unit 450 may concurrently (e.g., simultaneously) detect the first currents flowing through the first resistive films RR1 through RRj, when detecting the first currents flowing through the first resistive films RR1 through RRj extending in the first direction. In addition, the column detection driving unit 460 may concurrently detect the second currents flowing through the second resistive films RC1 through RCk, when detecting the second currents flowing through the second resistive films RC1 through RCk extending in the second direction. In some example embodiments, the scan driving unit 420, the data driving unit 430, the timing control unit 440, the row detection driving unit 450, the column detection driving unit 460, and the compensation control signal generating unit 470 may be integrated in one integrated circuit (IC) chip. In some example embodiments, at least one selected from the scan driving unit 420, the data driving unit 430, the timing control unit 440, the row detection driving unit 450, the column detection driving unit 460, and the compensation control signal generating unit 470 may be integrated in one IC chip.

Figure 4:
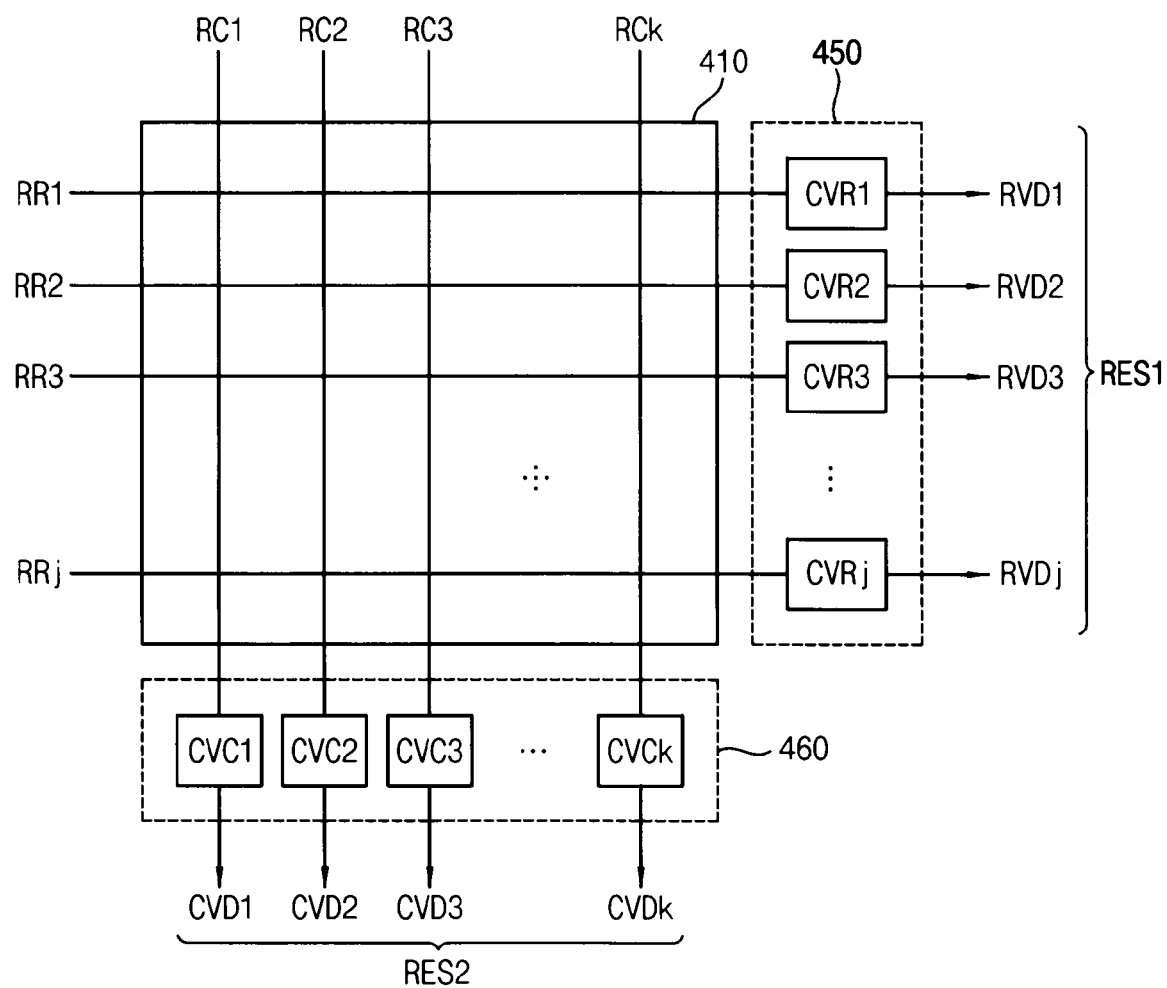
FIG. 4 is a block diagram illustrating an example of a row detection driving unit and a column detection driving unit included in the stretchable display device shown in FIG. 3.

FIG. 4 is a block diagram illustrating an example of a row detection driving unit and a column detection driving unit included in the stretchable display device of FIG. 3.

Referring to FIG. 4, the stretchable display panel 410 may be coupled to the row detection driving unit 450 (e.g., a row detection driver) via at least one first resistive film RR1 through RRj extending in a first direction (e.g., a row direction of the stretchable display panel 410), and may be coupled to the column detection driving unit 460 (e.g., a column detection driver) via at least one second resistive film RC1 through RCk extending in a second direction (e.g., a column direction of the stretchable display panel 410) intersecting with (e.g., crossing) the first direction.

As described above, the row detection driving unit 450 may detect a first current flowing through the first resistive film RR1 through RRj extending in the first direction to generate a first detection signal RES1 indicating the first current. Here, the row detection driving unit 450 may include at least one current-voltage conversion circuit CVR1 through CVRj that detects the first current flowing through the first resistive film RR1 through RRj extending in the first direction, and converts the detected first current to a voltage (e.g., a specific voltage). For example, the current-voltage conversion circuit CVR1 may detect the first current flowing through the first resistive film RR1, and may convert the detected first current to a row voltage RVD1. The current-voltage conversion circuit CVR2 may detect the first current flowing through the first resistive film RR2, and may convert the detected first current to a row voltage RVD2. The current-voltage conversion circuit CVR3 may detect the first current flowing through the first resistive film RR3, and may convert the detected first current to a row voltage RVD3. In an example embodiment, the current-voltage conversion circuits CVR1 through CVRj may sequentially detect the first currents flowing through the first resistive films RR1 through RRj along the column direction, and may sequentially output the row voltages RVD1 through RVDj. In another example embodiment, the current-voltage conversion circuits CVR1 through CVRj may concurrently detect the first currents flowing through the first resistive films RR1 through RRj, and may concurrently output the row voltages RVD1 through RVDj.

The column detection driving unit 460 may detect a second current flowing through the second resistive film RC1 through RCk extending in the second direction to generate a second detection signal RES2 indicating the second current. Here, the column detection driving unit 460 may include at least one current-voltage conversion circuit CVC1 through CVCk that detects the second current flowing through the second resistive film RC1 through RCk extending in the second direction, and converts the detected second current to a voltage (e.g., a specific voltage). For example, the current-voltage conversion circuit CVC1 may detect the second current flowing through the second resistive film RC1, and may convert the detected second current to a column voltage CVD1. The current-voltage conversion circuit CVC2 may detect the second current flowing through the second resistive film RC2, and may convert the detected second current to a column voltage CVD2. The current-voltage conversion circuit CVC3 may detect the second current flowing through the second resistive film RC3, and may convert the detected second current to a column voltage CVD3. In an example embodiment, the current-voltage conversion circuits CVC1 through CVCk may sequentially detect the second currents flowing through the second resistive films RC1 through RCk along the row direction, and may sequentially output the column voltages CVD1 through CVDk. In another example embodiment, the current-voltage conversion circuits CVC1 through CVCk may concurrently detect the second currents flowing through the second resistive films RC1 through RCk, and may concurrently output the column voltages CVD1 through CVDk.

As described above, the first detection signal RES1 output from the row detection driving unit 450 and the second detection signal RES2 output from the column detection driving unit 460 may be signals indicating respective voltages. That is, the first detection signal RES1 output from the row detection driving unit 450 may include at least one row voltage RVD1 through RVDj, and the second detection signal RES2 output from the column detection driving unit 460 may include at least one column voltage CVD1 through CVDk. Thus, as the first detection signal RES1 including the row voltage RVD1 through RVDj and the second detection signal RES2 including the column voltage CVD1 through CVDk are analyzed, a deformation of the resistive film due to a size change (e.g., a physical change) of the stretchable display panel 410 may be detected. Therefore, the stretchable display device 400 may perform luminance compensation for the stretchable display panel 410 in real-time by detecting a current change of respective locations of the stretchable display panel 410 as the size of the stretchable display panel 410 is changed. As a result, a luminance change of the stretchable display panel 410 due to a size change of the stretchable display panel 410 may be prevented or reduced. Although the current-voltage conversion circuit CVR1 through CVRj and CVC1 through CVCk is described above, the current-voltage conversion circuit CVR1 through CVRj and CVC1 through CVCk is not limited thereto. For example, in some example embodiments, the current-voltage conversion circuit CVR1 through CVRj and CVC1 through CVCk may include a sample-hold circuit, etc. That is, the current-voltage conversion circuit CVR1 through CVRj and CVC1 through CVCk should be interpreted as various kinds of circuits capable of converting a current into a voltage.

Figure 5:
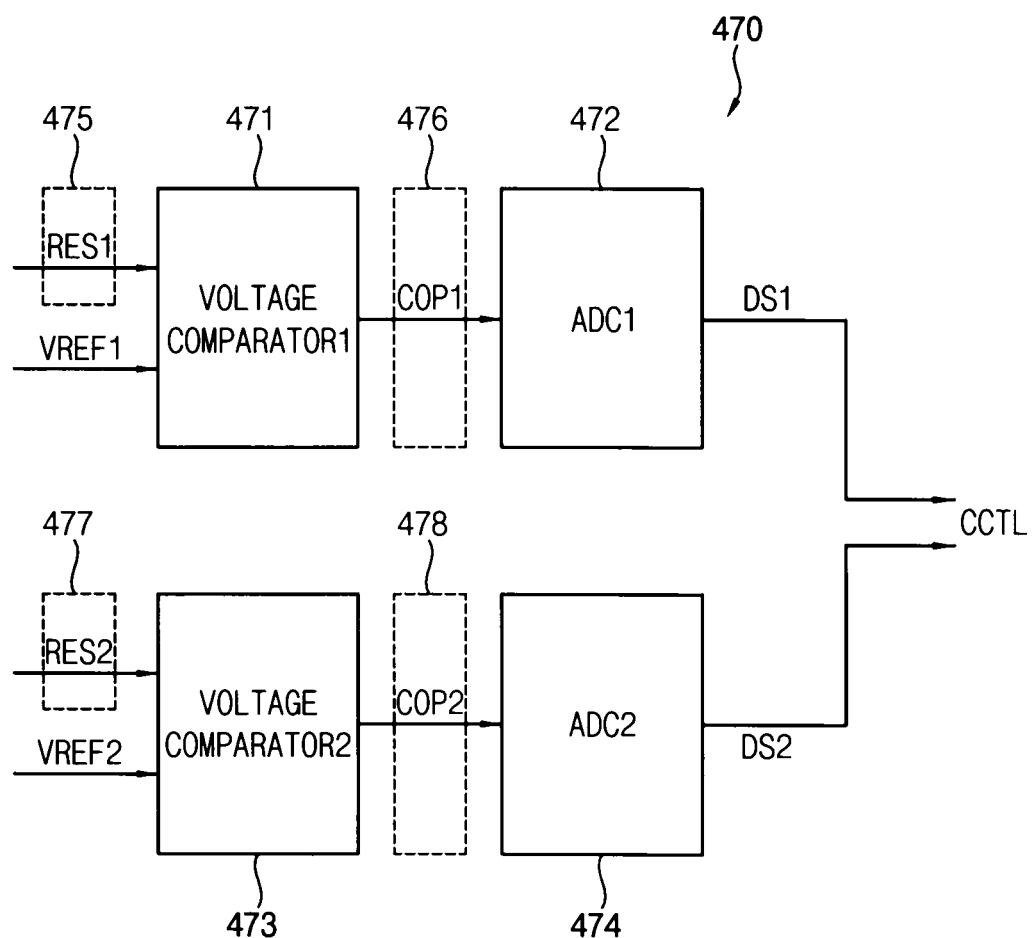
FIG. 5 is a block diagram illustrating an example of a compensation control signal generating unit included in the stretchable display device shown in FIG. 3.

FIG. 5 is a block diagram illustrating an example of a compensation control signal generating unit included in the stretchable display device of FIG. 3.

Referring to FIG. 5, the compensation control signal generating unit 470 (e.g., a compensation control signal generator) may include a first voltage comparator 471, a first analog-digital converter 472, a second voltage comparator 473, and a second analog-digital converter 474. As described above, the compensation control signal generating unit 470 may receive the first detection signal RES1 to detect an amount of variation of the first current flowing through the first resistive film RR1 through RRj extending in the first direction (e.g., the row direction), and may receive the second detection signal RES2 to detect an amount of variation of the second current flowing through the second resistive film RC1 through RCk extending in the second direction (e.g., the column direction). The compensation control signal generating unit 470 may generate the compensation control signal CCTL based on the amount of variation of the first current and the amount of variation of the second current.

The first voltage comparator 471 may compare the first detection signal RES1 output from the row detection driving unit 450 with a first reference voltage VREF1 (e.g., a predetermined first reference voltage) to output a first comparison signal COP1. That is, since the first detection signal RES1 output from the row detection driving unit 450 is a signal indicating a voltage, the first detection signal RES1 may be compared with the first reference voltage VREF1. Here, the first reference voltage VREF1 corresponds to a voltage at the time when the first current flowing through the first resistive film RR1 through RRj extending in the first direction is not changed. Thus, whether or not the first current flowing through the first resistive film RR1 through RRj is changed may be checked (or, determined) based on a comparison value between the first detection signal RES1 and the first reference voltage VREF1 (e.g., the first comparison signal COP1). In an example embodiment, the compensation control signal generating unit 470 may further include a first voltage amplifier 475 that amplifies the first detection signal RES1, and the first voltage amplifier 475 may be located in front of the first voltage comparator 471. In another example embodiment, the compensation control signal generating unit 470 may further include a third voltage amplifier 476 that amplifies the first comparison signal COP1, and the third voltage amplifier 476 may be located behind the first voltage comparator 471. In still another example embodiment, the compensation control signal generating unit 470 may further include both the first voltage amplifier 475 that amplifies the first detection signal RES1 located in front of the first voltage comparator 471, and the third voltage amplifier 476 that amplifies the first comparison signal COP1 located behind the first voltage comparator 471. Thus, when the compensation control signal generating unit 470 includes the first voltage amplifier 475 and/or the third voltage amplifier 476, a power for controlling the first current to flow through the first resistive film RR1 through RRj may be reduced, because an amount of variation of the first current may be detected even if the first detection signal RES1 is relatively weak (or, small). Next, the first analog-digital converter 472 may perform an analog-digital converting operation on the first comparison signal COP1 output from the first voltage comparator 471 to generate a first digital signal DS1. Therefore, the first digital signal DS1 included in the compensation control signal CCTL may indicate a row location of the pixels to which the compensated data signal is to be applied. In some example embodiments, the first digital signal DS1 may pass through a median filter so that noises included in the first digital signal DS1 may be eliminated or reduced.

The second voltage comparator 473 may compare the second detection signal RES2 output from the column detection driving unit 460 with a second reference voltage VREF2 (e.g., a predetermined second reference voltage) to output a second comparison signal COP2. That is, since the second detection signal RES2 output from the column detection driving unit 460 is a signal indicating a voltage, the second detection signal RES2 may be compared with the second reference voltage VREF2. Here, the second reference voltage VREF2 corresponds to a voltage at the time when the second current flowing through the second resistive film RC1 through RCk extending in the second direction is not changed. Thus, whether or not the second current flowing through the second resistive film RC1 through RCk is changed may be checked (or, determined) based on a comparison value between the second detection signal RES2 and the second reference voltage VREF2 (e.g., the second comparison signal COP2). In an example embodiment, the compensation control signal generating unit 470 may further include a second voltage amplifier 477 that amplifies the second detection signal RES2, and the second voltage amplifier 477 may be located in front of the second voltage comparator 473. In another example embodiment, the compensation control signal generating unit 470 may further include a fourth voltage amplifier 478 that amplifies the second comparison signal COP2, and the fourth voltage amplifier 478 may be located behind the second voltage comparator 473. In still another example embodiment, the compensation control signal generating unit 470 may further include both the second voltage amplifier 477 that amplifies the second detection signal RES2 located in front of the second voltage comparator 473, and the fourth voltage amplifier 478 that amplifies the second comparison signal COP2 located behind the second voltage comparator 473. Thus, when the compensation control signal generating unit 470 includes the second voltage amplifier 477 and/or the fourth voltage amplifier 478, a power for controlling the second current to flow through the second resistive film RC1 through RCk may be reduced, because an amount of variation of the second current may be detected even if the second detection signal RES2 is relatively weak (or, small). Next, the second analog-digital converter 474 may perform an analog-digital converting operation on the second comparison signal COP2 output from the second voltage comparator 473 to generate a second digital signal DS2. Therefore, the second digital signal DS2 included in the compensation control signal CCTL may indicate a column location of the pixels to which the compensated data signal is to be applied. In some example embodiments, the second digital signal DS2 may pass through a median filter so that noises included in the second digital signal DS2 may be eliminated or reduced.

Figure 6:
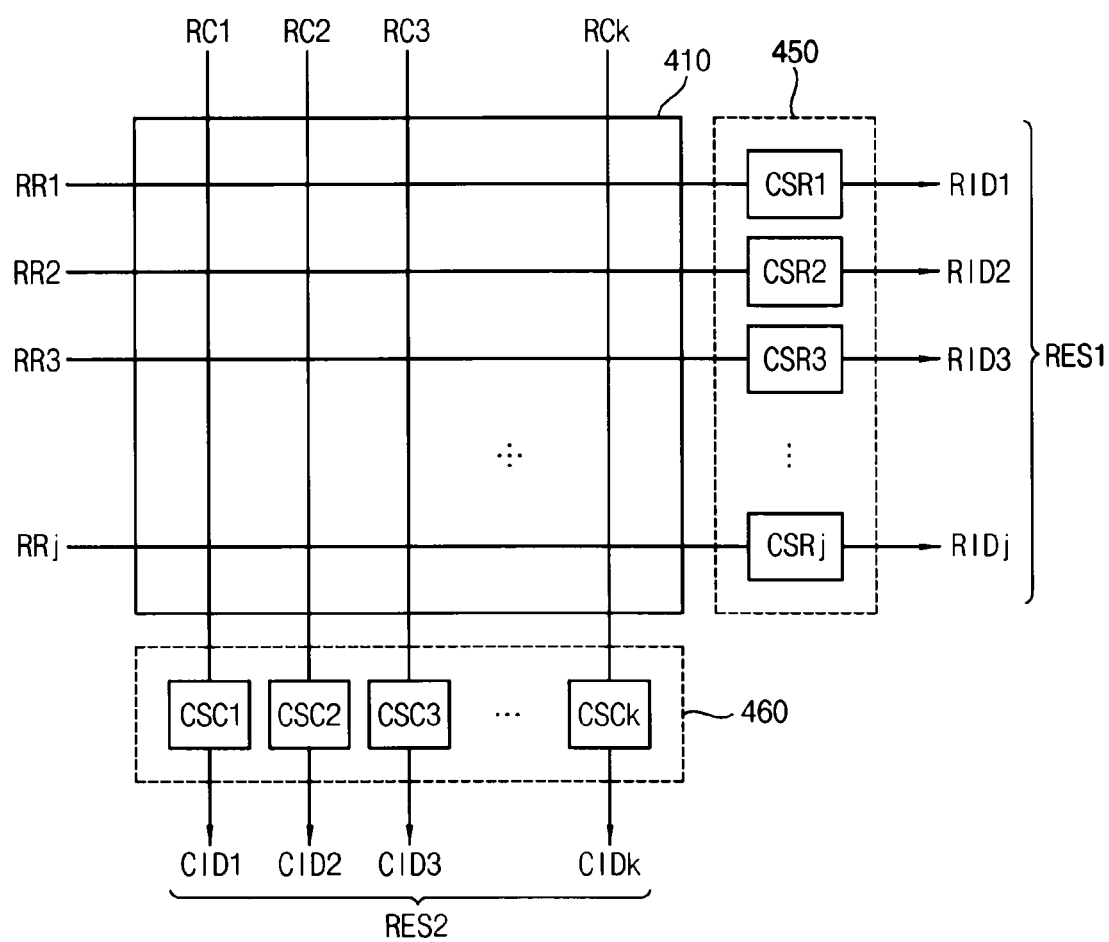
FIG. 6 is a block diagram illustrating another example of a row detection driving unit and a column detection driving unit included in the stretchable display device shown in FIG. 3.

FIG. 6 is a block diagram illustrating another example of a row detection driving unit and a column detection driving unit included in the stretchable display device of FIG. 3.

Referring to FIG. 6, the stretchable display panel 410 may be coupled to the row detection driving unit 450 (e.g., a row detection driver) via at least one first resistive film RR1 through RRj extending in a first direction (e.g., a row direction of the stretchable display panel 410), and may be coupled to the column detection driving unit 460 (e.g., a column detection driver) via at least one second resistive film RC1 through RCk extending in a second direction (e.g., a column direction of the stretchable display panel 410) intersecting with (e.g., crossing) the first direction.

As described above, the row detection driving unit 450 may detect a first current flowing through the first resistive film RR1 through RRj extending in the first direction to generate a first detection signal RES1 indicating the first current. Here, the row detection driving unit 450 may include at least one current sensing circuit CSR1 through CSRj that detects the first current flowing through the first resistive film RR1 through RRj extending in the first direction to output the detected first current. For example, the current sensing circuit CSR1 may detect the first current flowing through the first resistive film RR1, and may output a row current RID1 corresponding to the detected first current. The current sensing circuit CSR2 may detect the first current flowing through the first resistive film RR2, and may output a row current RID2 corresponding to the detected first current. The current sensing circuit CSR3 may detect the first current flowing through the first resistive film RR3, and may output a row current RIDS corresponding to the detected first current. In an example embodiment, the current sensing circuits CSR1 through CSRj may sequentially detect the first currents flowing through the first resistive films RR1 through RRj along the column direction, and may sequentially output the row currents RID1 through RIDj. In another example embodiment, the current sensing circuits CSR1 through CSRj may concurrently detect the first currents flowing through the first resistive films RR1 through RRj, and may concurrently output the row currents RID1 through RIDj.

The column detection driving unit 460 may detect a second current flowing through the second resistive film RC1 through RCk extending in the second direction to generate a second detection signal RES2 indicating the second current. Here, the column detection driving unit 460 may include at least one current sensing circuit CSC1 through CSCk that detects the second current flowing through the second resistive film RC1 through RCk extending in the second direction to output the detected second current. For example, the current sensing circuit CSC1 may detect the second current flowing through the second resistive film RC1, and may output a column current CID1 corresponding to the detected second current. The current sensing circuit CSC2 may detect the second current flowing through the second resistive film RC2, and may output a column current CID2 corresponding to the detected second current. The current sensing circuit CSC3 may detect the second current flowing through the second resistive film RC3, and may output a column current CID3 corresponding to the detected second current. In an example embodiment, the current sensing circuits CSC1 through CSCk may sequentially detect the second currents flowing through the second resistive films RC1 through RCk along the row direction, and may sequentially output the column currents CID1 through CIDk. In another example embodiment, the current sensing circuits CSC1 through CSCk may concurrently detect the second currents flowing through the second resistive films RC1 through RCk, and may concurrently output the column currents CID1 through CIDk.

As described above, the first detection signal RES1 output from the row detection driving unit 450 and the second detection signal RES2 output from the column detection driving unit 460 may be signals indicating respective currents. That is, the first detection signal RES1 output from the row detection driving unit 450 may include at least one row current RID1 through RIDj, and the second detection signal RES2 output from the column detection driving unit 460 may include at least one column current CID1 through CIDk. Thus, as the first detection signal RES1 including the row current RID1 through RIDj and the second detection signal RES2 including the column current CID1 through CIDk are analyzed, a deformation of the resistive film due to a size change (e.g., a physical change) of the stretchable display panel 410 may be detected. Therefore, the stretchable display device 400 may perform luminance compensation for the stretchable display panel 410 in real-time, by detecting a current change of respective locations of the stretchable display panel 410 as the size of the stretchable display panel 410 is changed. As a result, a luminance change of the stretchable display panel 410 due to a size change of the stretchable display panel 410 may be prevented or reduced. Although the current sensing circuit CSR1 through CSRj and CSC1 through CSCk is described above, the current sensing circuit CSR1 through CSRj and CSC1 through CSCk is not limited thereto. For example, in some example embodiments, the current sensing circuit CSR1 through CSRj and CSC1 through CSCk may include a current sensor, etc. That is, the current sensing circuit CSR1 through CSRj and CSC1 through CSCk should be interpreted as various kinds of circuits capable of detecting a current.

Figure 7:
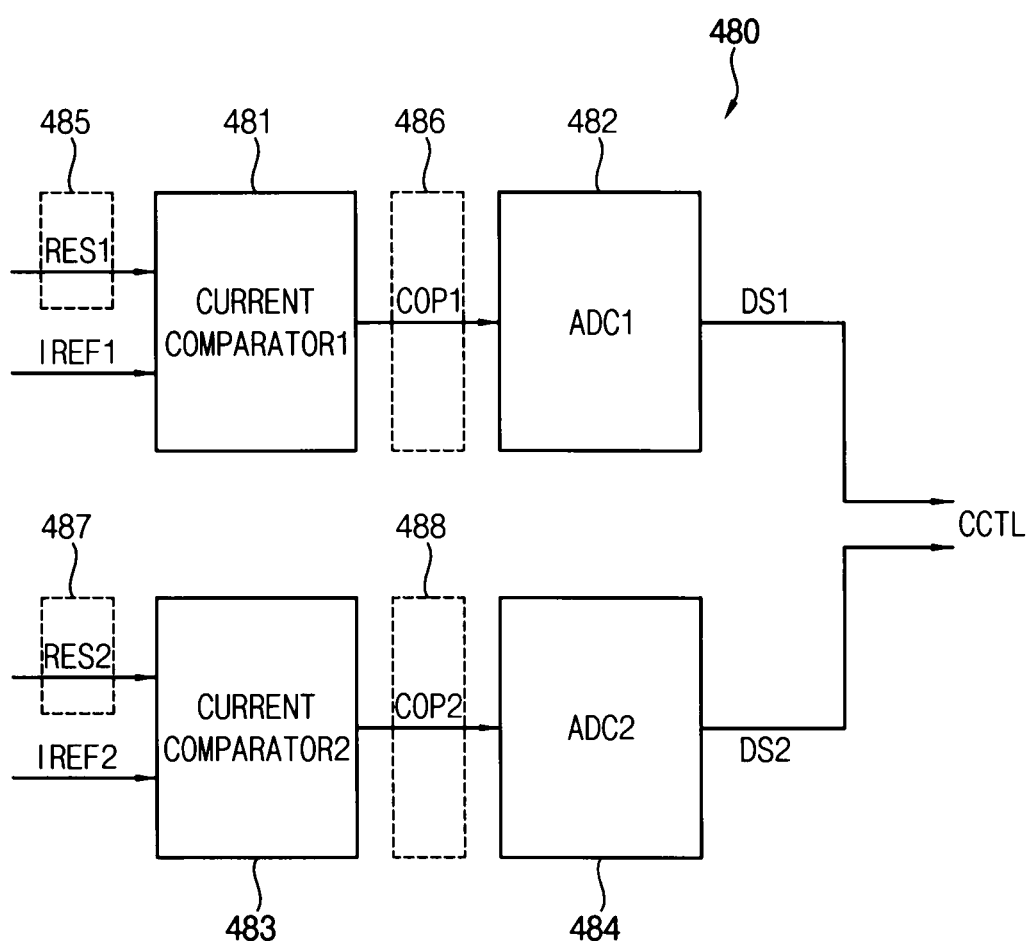
FIG. 7 is a block diagram illustrating another example of a compensation control signal generating unit included in the stretchable display device shown in FIG. 3.

FIG. 7 is a block diagram illustrating another example of a compensation control signal generating unit included in the stretchable display device of FIG. 3.

Referring to FIG. 7, the compensation control signal generating unit 470 (e.g., a compensation control signal generator) may include a first current comparator 481, a first analog-digital converter 482, a second current comparator 483, and a second analog-digital converter 484. As described above, the compensation control signal generating unit 470 may receive the first detection signal RES1 to detect an amount of variation of the first current flowing through the first resistive film RR1 through RRj extending in the first direction (e.g., the row direction), and may receive the second detection signal RES2 to detect an amount of variation of the second current flowing through the second resistive film RC1 through RCk extending in the second direction (e.g., the column direction). The compensation control signal generating unit 470 may generate the compensation control signal CCTL based on the amount of variation of the first current and the amount of variation of the second current.

The first current comparator 481 may compare the first detection signal RES1 output from the row detection driving unit 450 with a first reference current IREF1 (e.g., a predetermined first reference current) to output a first comparison signal COP1. That is, since the first detection signal RES1 output from the row detection driving unit 450 is a signal indicating a current, the first detection signal RES1 may be compared with the first reference current IREF1. Here, the first reference current IREF1 corresponds to a current at the time when the first current flowing through the first resistive film RR1 through RRj extending in the first direction is not changed. Thus, whether or not the first current flowing through the first resistive film RR1 through RRj is changed may be checked (or, determined) based on a comparison value between the first detection signal RES1 and the first reference current IREF1 (e.g., the first comparison signal COP1). In an example embodiment, the compensation control signal generating unit 470 may further include a first current amplifier 485 that amplifies the first detection signal RES1, and the first current amplifier 485 may be located in front of the first current comparator 481. In another example embodiment, the compensation control signal generating unit 470 may further include a first voltage amplifier 486 that amplifies the first comparison signal COP1, and the first voltage amplifier 486 may be located behind the first current comparator 481. In still another example embodiment, the compensation control signal generating unit 470 may further include both the first current amplifier 485 that amplifies the first detection signal RES1 located in front of the first current comparator 481, and the first voltage amplifier 486 that amplifies the first comparison signal COP1 located behind the first current comparator 481. Thus, when the compensation control signal generating unit 470 includes the first current amplifier 485 and/or the first voltage amplifier 486, a power for controlling the first current to flow through the first resistive film RR1 through RRj may be reduced, because an amount of variation of the first current may be detected even if the first detection signal RES1 is relatively weak (or, small). Next, the first analog-digital converter 482 may perform an analog-digital converting operation on the first comparison signal COP1 output from the first current comparator 481 to generate a first digital signal DS1. Therefore, the first digital signal DS1 included in the compensation control signal CCTL may indicate a row location of the pixels to which the compensated data signal is to be applied. In some example embodiments, the first digital signal DS1 may pass through a median filter so that noises included in the first digital signal DS1 may be eliminated or reduced.

The second current comparator 483 may compare the second detection signal RES2 output from the column detection driving unit 460 with a second reference current IREF2 (e.g., a predetermined second reference current) to output a second comparison signal COP2. That is, since the second detection signal RES2 output from the column detection driving unit 460 is a signal indicating a current, the second detection signal RES2 may be compared with the second reference current IREF2. Here, the second reference current IREF2 corresponds to a voltage at the time when the second current flowing through the second resistive film RC1 through RCk extending in the second direction is not changed. Thus, whether or not the second current flowing through the second resistive film RC1 through RCk is changed may be checked (or, determined) based on a comparison value between the second detection signal RES2 and the second reference current IREF2 (e.g., the second comparison signal COP2). In an example embodiment, the compensation control signal generating unit 470 may further include a second current amplifier 487 that amplifies the second detection signal RES2, and the second current amplifier 487 may be located in front of the second current comparator 483. In another example embodiment, the compensation control signal generating unit 470 may further include a second voltage amplifier 488 that amplifies the second comparison signal COP2, and the second voltage amplifier 488 may be located behind the second current comparator 483. In still another example embodiment, the compensation control signal generating unit 470 may further include both the second current amplifier 487 that amplifies the second detection signal RES2 located in front of the second current comparator 483, and the second voltage amplifier 488 that amplifies the second comparison signal COP2 located behind the second current comparator 483. Thus, when the compensation control signal generating unit 470 includes the second current amplifier 487 and/or the second voltage amplifier 488, a power for controlling the second current to flow through the second resistive film RC1 through RCk may be reduced, because an amount of variation of the second current may be detected even if the second detection signal RES2 is relatively weak (or, small). Next, the second analog-digital converter 484 may perform an analog-digital converting operation on the second comparison signal COP2 output from the second current comparator 483 to generate a second digital signal DS2. Therefore, the second digital signal DS2 included in the compensation control signal CCTL may indicate a column location of the pixels to which the compensated data signal is to be applied. In some example embodiments, the second digital signal DS2 may pass through a median filter so that noises included in the second digital signal DS2 may be eliminated or reduced.

Figure 8:
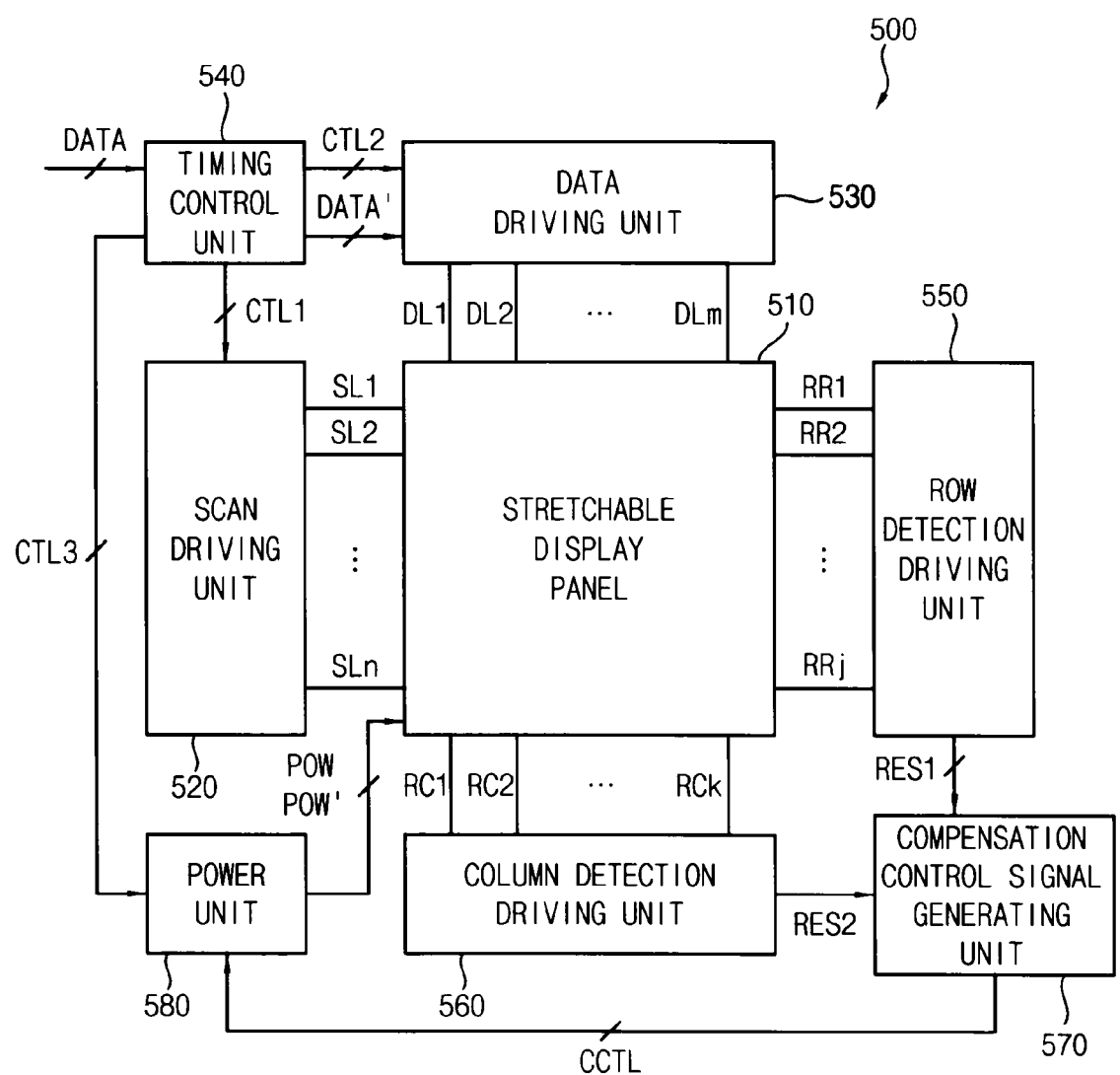
FIG. 8 is a block diagram illustrating a stretchable display device according to some example embodiments.

FIG. 8 is a block diagram illustrating a stretchable display device according to some example embodiments.

Referring to FIG. 8, the stretchable display device 500 may include a stretchable display panel 510, a scan driving unit 520 (e.g., a scan driver), a data driving unit 530 (e.g., a data driver), a timing control unit 540 (e.g., a timing controller), a row detection driving unit 550 (e.g., a row detection driver), a column detection driving unit 560 (e.g., a column detection driver), a compensation control signal generating unit 570 (e.g., a compensation control signal generator), and a power supply unit 580 (e.g., a power supply). Here, the stretchable display device 500 may be an organic light emitting display device.

The stretchable display panel 510 may include a plurality of pixels. The stretchable display panel 510 may be coupled to the scan driving unit 520 via first through n-th scan-lines SL1 through SLn. The stretchable display panel 510 may be coupled to the data driving unit 530 via first through m-th data-lines DL1 through DLm. Here, since the pixels are located at crossings (e.g., crossing regions) of the first through n-th scan-lines SL1 through SLn and the first through m-th data-lines DL1 through DLm, the stretchable display panel 510 may include n×m pixels. The stretchable display panel 510 may have elasticity and flexibility in a first direction (e.g., a direction parallel to the first through n-th scan-lines SL1 through SLn) and in a second direction (e.g., a direction parallel to the first through m-th data-lines DL1 through DLm). Thus, a size (or area) of the stretchable display panel 510 may be changed based on its elasticity and flexibility. Here, at least one first resistive film RR1 through RRj extending in the first direction, and at least one second resistive film RC1 through RCk extending in the second direction intersecting with (e.g., crossing) the first direction may be formed (or deposited) on the stretchable display panel 510. As illustrated in FIG. 8, the first direction may be a row direction (e.g., a direction parallel to the first through n-th scan-lines SL1 through SLn), and the second direction may be a column direction (e.g., a direction parallel to the first through m-th data-lines DL1 through DLm). However, the first and second directions are not limited thereto. For example, the first direction may not be perpendicular to the second direction.

The scan driving unit 520 may provide a scan signal to the stretchable display panel 510 via the first through n-th scan-lines SL1 through SLn. The data driving unit 530 may provide a data signal DATA to the stretchable display panel 510 via the first through m-th data-lines DL1 through DLm. The row detection driving unit 550 may detect the first current flowing through the first resistive film RR1 through RRj extending in the first direction to generate a first detection signal RES1 indicating the first current. The column detection driving unit 560 may detect the second current flowing through the second resistive film RC1 through RCk extending in the second direction to generate a second detection signal RES2 indicating the second current. The compensation control signal generating unit 570 may receive the first detection signal RES1 from the row detection driving unit 550 to detect an amount of variation of the first current, and may receive the second detection signal RES2 from the column detection driving unit 560 to detect an amount of variation of the second current. The compensation control signal generating unit 570 may generate a compensation control signal CCTL based on the amount of variation of the first current and the amount of variation of the second current.

In an example embodiment, the first detection signal RES1 output from the row detection driving unit 550 and the second detection signal RES2 output from the column detection driving unit 560 are signals indicating respective voltages. In this case, the row detection driving unit 550 may include at least one current-voltage conversion circuit that detects the first current flowing through the first resistive film RR1 through RRj extending in the first direction, and converts the detected first current into a voltage (e.g., a specific voltage). In addition, the column detection driving unit 560 may include at least one current-voltage conversion circuit that detects the second current flowing through the second resistive film RC1 through RCk extending in the second direction, and converts the detected second current into a voltage (e.g., a specific voltage). For example, as illustrated in FIG. 8, since the stretchable display panel 510 includes the first resistive films RR1 through RRj, the row detection driving unit 550 may include j current-voltage conversion circuits. In addition, since the stretchable display panel 510 includes the second resistive films RC1 through RCk, the column detection driving unit 560 may include k current-voltage conversion circuits. In another example embodiment, the first detection signal RES1 output from the row detection driving unit 550, and the second detection signal RES2 output from the column detection driving unit 560 are signals indicating respective currents. In this case, the row detection driving unit 550 may include at least one current sensing circuit (e.g., current sensor, etc.) that detects the first current flowing through the first resistive film RR1 through RRj extending in the first direction. In addition, the column detection driving unit 560 may include at least one current sensing circuit that detects the second current flowing through the second resistive film RC1 through RCk extending in the second direction. For example, as illustrated in FIG. 8, since the stretchable display panel 510 includes the first resistive films RR1 through RRj, the row detection driving unit 550 may include j current sensing circuits. In addition, since the stretchable display panel 510 includes the second resistive films RC1 through RCk, the column detection driving unit 560 may include k current sensing circuits.

The compensation control signal CCTL output from the compensation control signal generating unit 570 may include at least one selected from a first digital signal and a second digital signal. Here, the first digital signal may indicate a row location of the pixels to which a compensated power voltage POW' is to be applied, and the second digital signal may indicate a column location of the pixels to which the compensated power voltage POW' is to be applied. In other words, the compensation control signal generating unit 570 may generate the first digital signal based on the first detection signal RES1 output from the row detection driving unit 550, and may generate the second digital signal based on the second detection signal RES2 output from the column detection driving unit 560. Thus, the stretchable display device 500 may perform luminance compensation for the stretchable display panel 510 in real-time, by detecting a current change of respective locations of the stretchable display panel 510 as the size of the stretchable display panel 510 is changed (e.g., a physical change of the stretchable display panel 510 occurs). As a result, a luminance change of the stretchable display panel 510 due to a size change of the stretchable display panel 510 may be prevented or reduced. To this end, when the first detection signal RES1 output from the row detection driving unit 550 and the second detection signal RES2 output from the column detection driving unit 560 are signals indicating respective voltages, the compensation control signal generating unit 570 may include a plurality of voltage comparators and a plurality of analog-digital converters. When the first detection signal RES1 output from the row detection driving unit 550 and the second detection signal RES2 output from the column detection driving unit 560 are signals indicating respective currents, the compensation control signal generating unit 570 may include a plurality of current comparators and a plurality of analog-digital converters. Since the row detection driving unit 550 and the column detection driving unit 560 are described above, duplicated description will not be repeated.

The timing control unit 540 may generate control signals CTL1 and CTL2, and may provide the control signals CTL1 and CTL2 to the scan driving unit 520 and the data driving unit 530, respectively, to control the scan driving unit 520 and the data driving unit 530. The power supply unit 580 may provide a power voltage POW or the compensated power voltage POW' to the stretchable display panel 510 via a plurality of power-lines. Here, the power supply unit 580 may receive the compensation control signal CCTL from the compensation control signal generating unit 570, and may generate the compensated power voltage POW' based on the compensation control signal CCTL. For example, the compensated power voltage POW' may be generated by providing the compensation control signal CCTL to a DC-DC converter included in the power supply unit 580. In FIG. 8, it is assumed that a compensated high power voltage ELVDD' and a compensated low power voltage ELVSS' are generated as the compensated power voltage POW'. However, in some example embodiments, either the compensated high power voltage ELVDD' or the compensated low power voltage ELVSS' may be generated as the compensated power voltage POW'. Thus, the compensated power voltage POW' may be generated by compensating at least one selected from the high power voltage ELVDD and the low power voltage ELVSS that are provided to the stretchable display panel 510. For example, when the low power voltage ELVSS is a ground voltage GND, only the compensated high power voltage ELVDD' may be generated for luminance compensation.

Accordingly, the stretchable display device 500 may prevent or reduce luminance non-uniformity of the stretchable display panel 510 that is caused when the size of the stretchable display panel 510 is changed based on its elasticity and flexibility: by controlling the row detection driving unit 550 and/or the column detection driving unit 560 to detect a current flowing through the resistive films RR1 through RRj and RC1 through RCk formed (or deposited) on the stretchable display panel 510; by controlling the compensation control signal generating unit 570 to generate the compensation control signal CCTL based on the amount of variation of the current; and by controlling the power supply unit 580 to generate the compensated power voltage POW' based on the compensation control signal CCTL to provide the compensated power voltage POW' to the stretchable display panel 510. In an example embodiment, the row detection driving unit 550 may sequentially detect the first currents flowing through the first resistive films RR1 through RRj along the second direction when detecting the first current flowing through the first resistive films RR1 through RRj extending in the first direction. In addition, the column detection driving unit 560 may sequentially detect the second currents flowing through the second resistive films RC1 through RCk along the first direction when detecting the second currents flowing through the second resistive films RC1 through RCk extending in the second direction. In another example embodiment, the row detection driving unit 550 may concurrently detect the first currents flowing through the first resistive films RR1 through RRj when detecting the first currents flowing through the first resistive film RR1 through RRj extending in the first direction. In addition, the column detection driving unit 560 may concurrently detect the second currents flowing through the second resistive films RC1 through RCk when detecting the second currents flowing through the second resistive films RC1 through RCk extending in the second direction. In some example embodiments, the scan driving unit 520, the data driving unit 530, the timing control unit 540, the row detection driving unit 550, the column detection driving unit 560, the compensation control signal generating unit 570, and the power supply unit 580 may be integrated in one IC chip. In some example embodiments, at least one selected from the scan driving unit 520, the data driving unit 530, the timing control unit 540, the row detection driving unit 550, the column detection driving unit 560, the compensation control signal generating unit 570, and the power supply unit 580 may be integrated in one IC chip.

Figure 9:
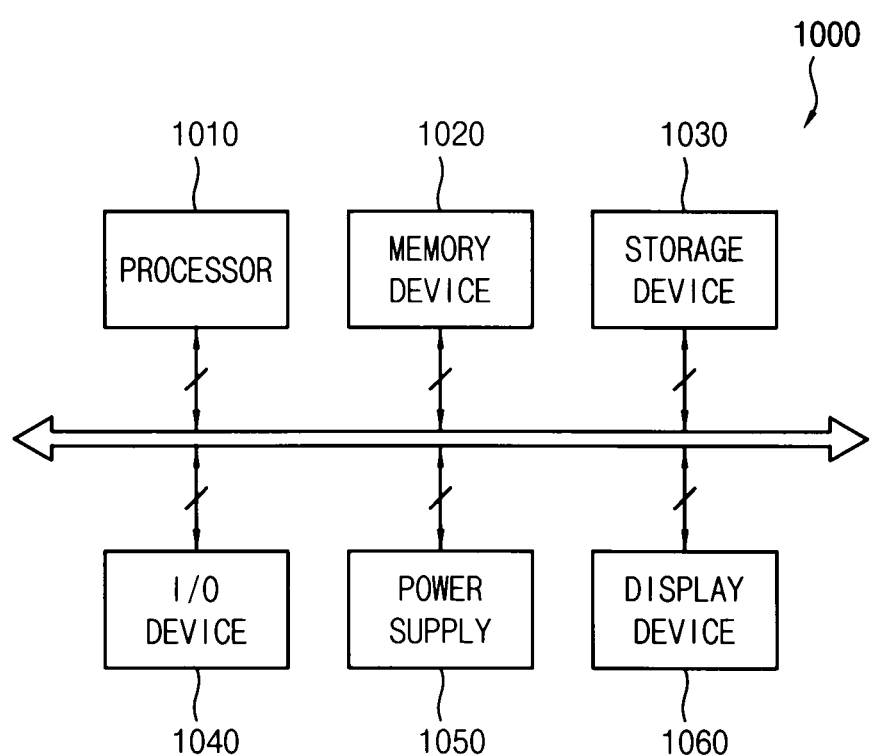
FIG. 9 is a block diagram illustrating an electronic device according to some example embodiments.
Figure 10:
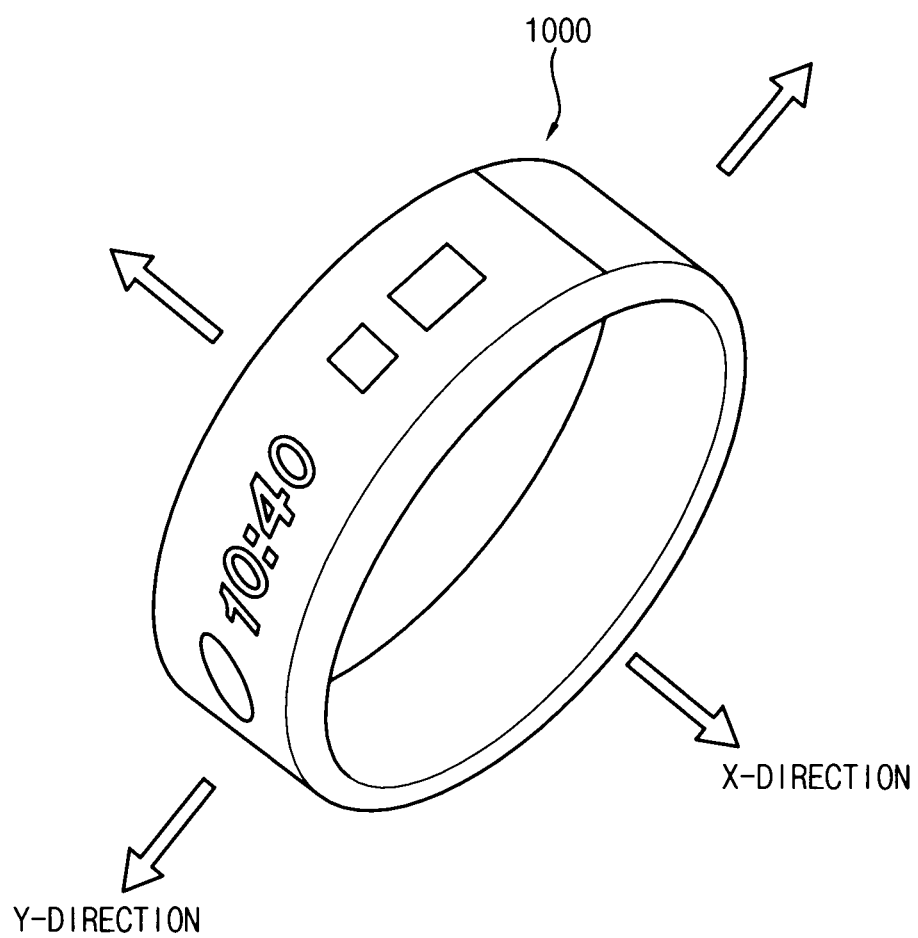
FIG. 10 is a diagram illustrating an example in which the electronic device shown in FIG. 9 is implemented as a smart watch.

FIG. 9 is a block diagram illustrating an electronic device according to some example embodiments. FIG. 10 is a diagram illustrating an example in which the electronic device shown in FIG. 9 is implemented as a smart watch.

Referring to FIGS. 9 and 10, the electronic device 1000 may include a processor 1010, a memory device 1020, a storage device 1030, an input/output (I/O) device 1040, a power supply 1050, and a stretchable display device 1060. Here, the stretchable display device 1060 may correspond to a stretchable display device 400 of FIG. 3 or a stretchable display device 500 of FIG. 8. In addition, the electronic device 1000 may further include a plurality of ports for communicating with a video card, a sound card, a memory card, a universal serial bus (USB) device, other electronic devices, etc. In an example embodiment, as illustrated in FIG. 10, the electronic device 1000 may be implemented as a smart watch. However, the electronic device 1000 is not limited thereto. For example, the electronic device 1000 may be implemented as a cellular phone, a smart phone, a video phone, a smart pad, a tablet PC, a navigation system, a television, a computer monitor, a laptop, a head mounted display (HMD), etc. Here, since the electronic device 1000 includes the stretchable display device 1060, the electronic device 1000 may have elasticity and flexibility in an X-axis direction X-DIRECTION and a Y-axis direction Y-DIRECTION of the electronic device 1000. Thus, when the electronic device 1000 includes a biosensor, the electronic device 1000 may perform, in real time, biorhythms check, disease diagnosis, etc., of a user wearing the electronic device 1000.

The processor 1010 may perform various computing functions. The processor 1010 may be a micro-processor, a central processing unit (CPU), an application processor (AP), etc. The processor 1010 may be coupled to other components via an address bus, a control bus, a data bus, etc. Further, the processor 1010 may be coupled to an extended bus, such as a peripheral component interconnection (PCI) bus. The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile DRAM device, etc. The storage device 1030 may be a solid state drive (SSD) device, a hard disk drive (HDD) device, a CD-ROM device, etc. The I/O device 1040 may be an input device, such as a keyboard, a keypad, a mouse device, a touchpad, a touch-screen, etc., and an output device, such as a printer, a speaker, etc. The power supply 1050 may provide power for operations of the electronic device 1000. In some example embodiments, the stretchable display device 1060 may be included in the I/O device 1040. The stretchable display device 1060 may be coupled to other components via the buses or other communication links. As described above, the stretchable display device 1060 may prevent or reduce luminance non-uniformity (e.g., luminance spot, etc.) of the stretchable display panel that is caused when a size (or area) of the stretchable display panel is changed based on its elasticity and flexibility: by detecting a current flowing through a resistive film formed (or, deposited) on the stretchable display panel; by generating a compensation control signal based on an amount of variation of the current; and by providing a feedback signal (e.g., a compensated data signal or a compensated power voltage) to the stretchable display panel based on the compensation control signal.

In an example embodiment, the stretchable display device 1060 may include: a stretchable display panel including a plurality of pixels, where at least one first resistive film extending in a first direction and at least one second resistive film extending in a second direction intersecting with (e.g., crossing) the first direction are formed on the stretchable display panel; a scan driving unit (e.g., a scan driver) that provides scan signals to the pixels via a plurality of scan-lines; a data driving unit (e.g., a data driver) that provides data signals or compensated data signals to the pixels via a plurality of data-lines; a row detection driving unit (e.g., a row detection driver) that detects a first current flowing through the first resistive film to generate a first detection signal indicating the first current; a column detection driving unit (e.g., a column detection driver) that detects a second current flowing through the second resistive film to generate a second detection signal indicating the second current; a compensation control signal generating unit (e.g., a compensation control signal generator) that receives the first detection signal to detect an amount of variation of the first current, receives the second detection signal to detect an amount of variation of the second current, and generates a compensation control signal based on the amount of the variation of the first current and the amount of the variation of the second current; and a timing control unit (e.g., a timing controller) that controls the scan driving unit and the data driving unit, and generates the compensated data signal based on the compensation control signal. In another example embodiment, the stretchable display device 1060 may include: a stretchable display panel including a plurality of pixels, where at least one first resistive film extending in a first direction and at least one second resistive film extending in a second direction intersecting with (e.g., crossing) the first direction are formed on the stretchable display panel; a scan driving unit (e.g., a scan driver) that provides scan signals to the pixels via a plurality of scan-lines; a data driving unit (e.g., a data driver) that provides data signals to the pixels via a plurality of data-lines; a row detection driving unit (e.g., a row detection driver) that detects a first current flowing through the first resistive film to generate a first detection signal indicating the first current; a column detection driving unit (e.g., a column detection driver) that detects a second current flowing through the second resistive film to generate a second detection signal indicating the second current; a compensation control signal generating unit (e.g., a compensation control signal generator) that receives the first detection signal to detect an amount of variation of the first current, receives the second detection signal to detect an amount of variation of the second current, and generates a compensation control signal based on the amount of the variation of the first current and the amount of the variation of the second current; a timing control unit (e.g., a timing controller) that controls the scan driving unit and the data driving unit; and a power supply unit (e.g., a power supply) that generates a compensated power voltage based on the compensation control signal, and provides a power voltage or the compensated power voltage via a plurality of power-lines to the stretchable display panel. Since the stretchable display device 1060 is described above, duplicated descriptions will not be repeated.

The present inventive concept may be applied to a stretchable display device and a system including the stretchable display device. For example, the present inventive concept may be applied to a smart watch, a cellular phone, a smart phone, a video phone, a smart pad, a tablet PC, a navigation system, a television, a computer monitor, a laptop, a head mounted display (HMD), etc.

The foregoing is illustrative of example embodiments only, and is not to be construed as limiting thereof. Although a few example embodiments have been described, those skilled in the art will readily appreciate that various modifications are possible in the example embodiments, without materially departing from the spirit and scope of the present inventive concept. Accordingly, all such modifications are intended to be included within the spirit and scope of the present inventive concept as defined in the claims, and their equivalents. Therefore, it is to be understood that the foregoing is illustrative of various example embodiments and is not to be construed as limited to the specific example embodiments disclosed, and that modifications to the disclosed example embodiments, as well as other example embodiments, are intended to be included within the spirit and scope of the appended claims, and their equivalents.

What is claimed is:

1. A stretchable display device comprising:
   a stretchable display panel comprising:
      a plurality of pixels;
      at least one first resistive film extending in a first direction; and
      at least one second resistive film extending in a second direction crossing the first direction on the stretchable display panel;
   a scan driver configured to provide a scan signal to the pixels via a plurality of scan-lines;
   a data driver configured to provide a data signal or a compensated data signal to the pixels via a plurality of data-lines;
   a row detection driver configured to detect a first current flowing through the first resistive film to generate a first detection signal corresponding to the first current;
   a column detection driver configured to detect a second current flowing through the second resistive film to generate a second detection signal corresponding to the second current;
   a compensation control signal generator configured to receive the first detection signal to detect an amount of variation of the first current, to receive the second detection signal to detect an amount of variation of the second current, and to generate a compensation control signal based on the amount of the variation of the first current and the amount of the variation of the second current; and
   a timing controller configured to control the scan driver and the data driver, and to generate the compensated data signal based on the compensation control signal,
   wherein the compensation control signal includes at least one selected from a first digital signal and a second digital signal,
   wherein the first digital signal corresponds to a row location of the pixels to which the compensated data signal is to be applied, and
   wherein the second digital signal corresponds to a column location of the pixels to which the compensated data signal is to be applied.

2. The stretchable display device of claim 1, wherein the first detection signal and the second detection signal are signals corresponding to respective voltages, and wherein each of the row detection driver and the column detection driver comprises at least one current-voltage conversion circuit.

3. The stretchable display device of claim 2, wherein the compensation control signal generator comprises:
   a first voltage comparator configured to compare the first detection signal with a first reference voltage to output a first comparison signal;
   a second voltage comparator configured to compare the second detection signal with a second reference voltage to output a second comparison signal;
   a first analog-digital converter configured to perform an analog-digital converting operation on the first comparison signal to generate the first digital signal; and
   a second analog-digital converter configured to perform an analog-digital converting operation on the second comparison signal to generate the second digital signal.

4. The stretchable display device of claim 3, wherein the compensation control signal generator further comprises:
   a first voltage amplifier configured to amplify the first detection signal; and
   a second voltage amplifier configured to amplify the second detection signal.

5. The stretchable display device of claim 3, wherein the compensation control signal generator further comprises:
   a third voltage amplifier configured to amplify the first comparison signal; and
   a fourth voltage amplifier configured to amplify the second comparison signal.

6. The stretchable display device of claim 1, wherein the first detection signal and the second detection signal are signals corresponding to respective currents, and wherein each of the row detection driver and the column detection driver comprises at least one current sensing circuit.

7. The stretchable display device of claim 6, wherein the compensation control signal generator comprises:
   a first current comparator configured to compare the first detection signal with a first reference current to output a first comparison signal;
   a second current comparator configured to compare the second detection signal with a second reference current to output a second comparison signal;
   a first analog-digital converter configured to perform an analog-digital converting operation on the first comparison signal to generate the first digital signal; and
   a second analog-digital converter configured to perform an analog-digital converting operation on the second comparison signal to generate the second digital signal.

8. The stretchable display device of claim 7, wherein the compensation control signal generator further comprises:
   a first current amplifier configured to amplify the first detection signal; and
   a second current amplifier configured to amplify the second detection signal.

9. The stretchable display device of claim 7, wherein the compensation control signal generator further comprises:
   a first voltage amplifier configured to amplify the first comparison signal; and
   a second voltage amplifier configured to amplify the second comparison signal.

10. The stretchable display device of claim 1, wherein the stretchable display device comprises an organic light emitting display device that comprises a power supply configured to provide a high power voltage and a low power voltage to the pixels via a plurality of power-lines.

11. The stretchable display device of claim 1, wherein the stretchable display device comprises a liquid crystal display device that comprises a backlight unit configured to provide light to the stretchable display panel.

12. A stretchable display device comprising:
    a stretchable display panel comprising:
       a plurality of pixels;
       at least one first resistive film extending in a first direction; and at least one second resistive film extending in a second direction crossing the first direction on the stretchable display panel;
a scan driver configured to provide a scan signal to the pixels via a plurality of scan-lines;
a data driver configured to provide a data signal to the pixels via a plurality of data-lines;
a row detection driver configured to detect a first current flowing through the first resistive film to generate a first detection signal corresponding to the first current;
a column detection driver configured to detect a second current flowing through the second resistive film to generate a second detection signal corresponding to the second current;
a compensation control signal generator configured to receive the first detection signal to detect an amount of variation of the first current, to receive the second detection signal to detect an amount of variation of the second current, and to generate a compensation control signal based on the amount of the variation of the first current and the amount of the variation of the second current;
a timing controller configured to control the scan driver and the data driver; and a power supply configured to generate a compensated power voltage based on the compensation control signal, and to provide a power voltage or the compensated power voltage to the stretchable display panel via a plurality of power-lines,
wherein the compensation control signal includes at least one selected from a first digital signal and a second digital signal,
wherein the first digital signal corresponds to a row location of the pixels to which the compensated power voltage is to be applied, and
wherein the second digital signal corresponds to a column location of the pixels to which the compensated power voltage is to be applied.

13. The stretchable display device of claim 12, wherein the stretchable display device comprises an organic light emitting display device, and
wherein the power supply is configured to generate the compensated power voltage by compensating at least one selected from a high power voltage and a low power voltage that are to be applied to the pixels.

14. The stretchable display device of claim 12, wherein the first detection signal and the second detection signal are signals corresponding to respective voltages, and wherein each of the row detection driver and the column detection driver comprises at least one current-voltage conversion circuit.

15. The stretchable display device of claim 14, wherein the compensation control signal generator comprises:
a first voltage comparator configured to compare the first detection signal with a first reference voltage to output a first comparison signal;
a second voltage comparator configured to compare the second detection signal with a second reference voltage to output a second comparison signal;
a first analog-digital converter configured to perform an analog-digital converting operation on the first comparison signal to generate the first digital signal; and
a second analog-digital converter configured to perform an analog-digital converting operation on the second comparison signal to generate the second digital signal.

16. The stretchable display device of claim 12, wherein the first detection signal and the second detection signal are signals corresponding to respective currents, and wherein each of the row detection driver and the column detection driver comprises at least one current sensing circuit.

17. The stretchable display device of claim 16, wherein the compensation control signal generator comprises:
a first current comparator configured to compare the first detection signal with a first reference current to output a first comparison signal;
a second current comparator configured to compare the second detection signal with a second reference current to output a second comparison signal;
a first analog-digital converter configured to perform an analog-digital converting operation on the first comparison signal to generate the first digital signal; and
a second analog-digital converter configured to perform an analog-digital converting operation on the second comparison signal to generate the second digital signal.

* * * * *